US008024114B2

United States Patent
Doyle

(10) Patent No.: US 8,024,114 B2
(45) Date of Patent: Sep. 20, 2011

(54) NAVIGATION DATA QUALITY FEEDBACK

(75) Inventor: Thomas F. Doyle, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1019 days.

(21) Appl. No.: 11/345,977

(22) Filed: Feb. 1, 2006

(65) Prior Publication Data

US 2007/0179709 A1    Aug. 2, 2007

(51) Int. Cl.
  *G08G 1/0969*   (2006.01)
  *G08G 1/127*    (2006.01)
  *G01C 21/34*    (2006.01)
  *G01C 21/00*    (2006.01)
  *G01C 21/26*    (2006.01)

(52) U.S. Cl. ........ 701/210; 701/200; 701/201; 701/207; 701/208; 701/209

(58) Field of Classification Search ............. 340/995.19, 340/995.23; 342/357.1; 701/117, 200–201, 701/205, 207–210, 213, 224
See application file for complete search history.

(56) References Cited

U.S. PATENT DOCUMENTS

| | | | | |
|---|---|---|---|---|
| 5,400,020 | A  * | 3/1995 | Jones et al. | 340/994 |
| 6,418,373 | B1 * | 7/2002 | Omi et al. | 701/209 |
| 6,801,850 | B1   | 10/2004 | Wolfson | |
| 6,845,322 | B1   | 1/2005 | Chao et al. | |
| 7,680,595 | B2 * | 3/2010 | Brinton et al. | 701/209 |
| 2002/0111736 | A1 * | 8/2002 | Chowanic et al. | 701/209 |
| 2004/0064245 | A1   | 4/2004 | Knockeart et al. | |
| 2004/0073356 | A1 * | 4/2004 | Craine | 701/117 |
| 2004/0113772 | A1 * | 6/2004 | Hong Chou | 340/539.13 |
| 2004/0199325 | A1 * | 10/2004 | Kishigami | 701/210 |
| 2005/0174235 | A1 * | 8/2005 | Davis et al. | 340/539.13 |
| 2007/0294031 | A1 * | 12/2007 | Brinton et al. | 701/209 |
| 2010/0004840 | A1 * | 1/2010 | Klotz et al. | 701/96 |

OTHER PUBLICATIONS

International Search Report, PCT/US2007/061498. International Searching Authority—European Patent Office. Aug. 23, 2007.
Written Opinion of the International Searching Authority, PCT/US2007/061498. International Searching Authority—European Patent Office. Aug. 23, 2007.

* cited by examiner

*Primary Examiner* — Khoi Tran
*Assistant Examiner* — Dale Moyer
(74) *Attorney, Agent, or Firm* — Richard A. Bachand; Gerald P. Joyce, III

(57) ABSTRACT

A computer assisted navigation system determines a recommended route for a vehicle to travel between a source and destination location, and provides exception notifications in some events where the vehicle travels a route different that the recommended route. The vehicle includes a navigation system that has a location monitoring component. It is determined if the location of the vehicle is different than a location along the recommended route. An exception notification is generated when the vehicle is not along the recommended route it is likely that the reason the recommended route was not used is because the recommended route is not the optimal route between the source and destination locations.

25 Claims, 5 Drawing Sheets

NAVIGATION DATA QUALITY FEEDBACK

BACKGROUND

1. Field

This disclosure relates to computer assisted navigation systems, and more particularly, to apparatuses, systems, and methods for maintaining data quality for use in computer assisted navigation systems.

2. Background Information

Computer assisted navigation systems are used in many different applications. One application that has found wide acceptance is vehicle routing. Such an application provides driving directions to an operator of a vehicle. Such a computer assisted navigation system has access to a database that includes a map of various different driving routes for an area of interest. The system analyzes the map and provides provide navigation assistance such as particular routes between locations. For example, an automobile may have such a computer assisted navigation system. A driver of the automobile may enter a desired destination into the computer assisted navigation system. The computer assisted navigation system then provides a suggested route to the desired destination. Similarly, a trucking company may provide such navigation systems to operators of trucks in order to provide operators with driving directions. Such navigation systems enhance efficiency of route determination by providing operators with route information without requiring the operator to spend a significant amount of time studying a map to determine a route.

Such computer assisted navigation systems commonly include a location sensor, such as a global positioning system (GPS) receiver that provides location coordinates, a controller/processor, a memory containing a map of the area of interest, and a user interface. For example, a driver of an automobile may enter a desired destination into the user interface, and the navigation system provides a suggested route from the present location of the automobile to the desired destination. Such a suggested route may include a route that has the shortest distance between the present location and the desired destination, or the route when the expected shortest time between the present location and the desired destination. A shortest distance is determined by accessing a database that includes a map between the present location and the desired destination, evaluating the different possible routes to the desired destination, and determining which route has the shortest distance. A route that has the expected shortest driving time is determined by accessing a database that has a map of driving routes between the current location and desired destination, along with expected speeds at which the vehicle will travel while on the different routes. The distance and expected speeds of the various routes are analyzed to determine the route that is expected to yield the shortest driving time. For example, two different possible routes may be available for traveling from a present location to the desired destination, a first route that primarily travels over residential streets, and a second route that primarily travels over a divided highway. The first route may provide a shorter distance than the second route, but the expected travel time for the second route may be shorter than the first route. The algorithms for route determination can become quite complex.

Similarly, the trucking industry commonly uses such computer assisted navigation systems. A system located in a truck in such an application may communicate with a dispatch center to receive the destination for a particular delivery, and may also receive a suggested route to the destination. The suggested route, similarly as in automobile applications, may include the route with the shortest expected driving time, the shortest total distance, and/or the route with the shortest expected driving time that does not include any tolls. A driver may follow the route to deliver the shipment to the destination. The determination of the optimal route is of particular importance in such applications, as non-optimal routes may result in shipments not arriving on time, potential spoilage of materials in the shipment, and in general result in higher costs.

Route determination is based on many factors, some of which are discussed above, such as distance, expected driving time, and potential tolls. The distance is often determined using graphic information systems (GIS) applications that provide geographic coordinate locations to a relatively high degree of accuracy. These coordinates are used to determine distance information for a particular route. Further information related to a particular route or portion of a route is accessed, such as speeds that are expected for particular portions of the route. Furthermore, even further information may be accessed, such as expected driving speeds for a particular time of day, and information related to expected construction or weather delays for particular routes.

The determination of an optimal route is thus highly dependent upon the accuracy of route information, and the accuracy of such additional information such as expected traffic or construction delays. The determination of such additional information, and thus the determination of the optimal route, is often difficult.

SUMMARY

Disclosed is an apparatus, system, and method for enhancing the accuracy of route information provided to computer assisted navigation systems. An actual route of a vehicle in traveling from a first location to a second location is paired to a recommended route provided by the navigation system, and deviations from the recommended route are analyzed to determine if the deviation indicates that the recommended route is not an optimal route. In one embodiment, a method is provided for determining exceptions from a recommended route in a navigation application. The method of this embodiment comprises the steps of: (a) providing to a computer assisted navigation system a recommended route for a vehicle to travel from a first location to a second location; (b) monitoring a location of the vehicle when the vehicle is traveling from the first location to the second location; (c) determining that the vehicle has deviated from the recommended route; and (d) generating an exception notification when the deviation from the recommended route is different than a predetermined deviation. In determining that the vehicle has deviated from the recommended route, in an embodiment, the method provides first determining that a location of the vehicle is different than an expected location along the recommended route, and second determining that the location of the vehicle is back within an expected location along the recommended route. In some cases, the location of the vehicle may not be back within an expected location along the recommended route until the vehicle reaches the second location. In another embodiment, the step of generating and exception notification includes determining that the vehicle did not stop for longer than a predetermined time period when the vehicle was not on the recommended route, and generating the exception notification when the vehicle did not stop for longer than the predetermined time period. In another embodiment, the step of generating an exception notification includes first determining that the current location of the vehicle is greater than a predetermined distance from an expected location of the vehicle along the recommended route and generating the exception notification in such a situation. The exception notification may be generated after a predetermined time period has elapsed since the vehicle location has been different than the expected location along the recommended route. In yet another embodiment, the step of generating an exception notification includes determining that there were no stops of longer than predetermined time period after determining that the vehicle has deviated from the recommended route, and generating the exception notification when there are no such stops.

In another embodiment, a computer assisted navigation system is provided that is operably interconnected with a vehicle and operable to assist a driver of the vehicle with navigation, the system comprising: (a) a location sensor operable to output a current location; (b) a wireless communication portion operable to send/receive wireless communication; (c) a controller coupled to the location sensor and wireless communication portion; and (d) a user interface operable to provide the driver with navigation information. In this embodiment, the controller is operable to receive the current location from the location sensor, use the location information to determine that the vehicle is at a location that is different than a location within a recommended route, and generate an exception notification when the difference in location is not within a set of defined rules. In one embodiment, the controller is operable to receive current location information from the location sensor and transmit, using the wireless communication portion, the current location to a remote server. In another embodiment, the controller generates the exception notification when the vehicle does not stop for longer than a predetermined time period when the vehicle location is different than a location within the recommended route. In yet a further embodiment, the controller is also operable to generate a query to the operator of the vehicle requesting information about the deviation from the recommended route and generates the exception notification when the operator indicates the recommended route was not an optimal route.

Another embodiment provides a method for determining exceptions from a recommended route in a navigation application, the method comprising the steps of: (a) providing a computer assisted navigation system that is capable of noting deviations from a recommended route; (b) determining that a vehicle has deviated from the recommended route; (c) determining if other vehicles have made similar deviations from the recommended route; and (d) generating an exception notification when at least two vehicles made similar deviations from the recommended route.

DETAILED DESCRIPTION

There is a need and desire to provide accurate data for use in determining enhanced routing for a navigation system in a vehicle. Providing enhanced routing results in more efficient travel between an origination and a destination. Such efficient transportation may be particularly useful for a company or an enterprise that uses significant resources for traveling, such as sales forces that travel by vehicle and delivery vehicles that transport materials. Providing accurate routing data to navigation systems used by such companies to enhance routing information may significantly enhance the use of resources both by reducing the time of travel and by reduced fuel consumption and vehicle miles driven. As will be understood, the most efficient route may not necessarily be the route that has the least mileage, but may be the route that provides the fastest travel time. Thus, systems, methods, and apparatuses are herein provided to enhance data related to routing information and thus provide more accurate routing information used by an enterprise to enhance such use of resources.

Figure 1:
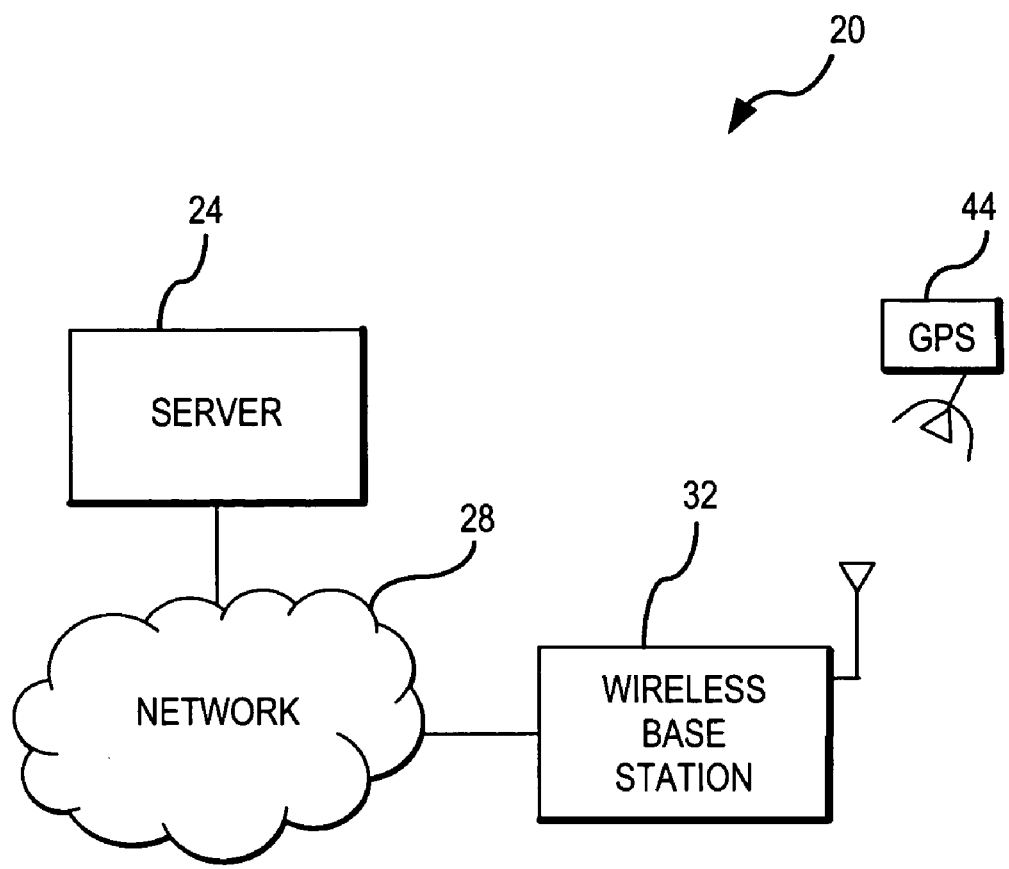
FIG. 1 is a block diagram illustration of an asset tracking system of an embodiment of the invention.

FIG. 1 is a block diagram of an exemplary mobile communications network 20 that is capable of communicating routing information and monitoring the location of various vehicles. The mobile communications network 20 includes a server 24 interconnected to a network 28. The server 24 may reside in a dispatch center for a company, or may be connected to a dispatch center via another network (not shown) such as the Internet. A user or software application associated with the server 24 may communicate dispatches to vehicles 36, such dispatches may include instructions that a driver associated with a vehicle is to pick up and/or make a delivery from/to a particular location. The dispatches may include routing information that a vehicle navigation system 40 that is used to provide navigation information to a driver of the vehicle 36. Such dispatches may also include new information related to various routes that may be used by the vehicle, with the navigation system 40 providing routing information based on maps and/or other data stored in a memory of the navigation system 40. In addition to dispatch and routing functions, the navigation system 40 may also be capable of sending and receiving voice calls and text/data messages other than dispatch and routing functions. Furthermore, in some embodiments the navigation system does not provide navigation information, but provides a history of the route taken to the dispatch that may then be used for billing purposes such as determination of mileage and/or tolls/taxes paid, and also for analysis of the route taken that may be used in determining future routing information. The network 28 may be a public switched telephone network (PSTN), or any other network or combination of networks that are known in the art, that connect the server 24 to a number of wireless base stations 32. A single wireless base station is illustrated in FIG. 1 for purposes of discussion and explanation, with the understanding that a wireless communication network typically contains numerous such stations. The wireless base stations 32 operate to provide wireless communications between the network 28 and navigation devices 40. The wireless base stations 32 and navigation devices 40 may communicate using any applicable wireless communication scheme over a voice channel and/or control channel. Communication may use any available analog and/or digital technology, including the various different types of digital communications, as well as combinations thereof. The navigation devices 40 also includes position sensing receivers that are capable of providing the location of the navigation device 40, and thus providing a location of the vehicle 36. In this embodiment, the position sensing receivers include GPS receivers that receive signals from various GPS satellites 44. As is understood in the art, a GPS receiver operates to provide location information to a relatively high degree of accuracy by performing well known trilateration algorithms based on signals from several GPS satellites 40.

In one specific embodiment, the server 24 is located in a control and dispatch center of a trucking company having a number of vehicles 36 that transport materials to/from various sources/destinations. Each of the vehicles has one or more navigation systems 40 that provide routing information to the driver of the vehicle 36. In this manner, the materials may be transported by the trucking company with enhanced efficiency, thus reducing transport costs by enabling the trucking company to maintain its vehicles a working (i.e. transporting materials) state in an enhanced manner. A dispatcher located at the dispatch center enters a command to dispatch a job to server 24, such a dispatch including source/destination information, and any other information required to establish the dispatch. The dispatch may also include routing information that is generated by the server or associated application that provides the information to the server. Alternatively, in some embodiments, the navigation system 40 receives the source/destination locations and determines routing information based on a map and related data stored at the navigation system 40. A driver may acknowledge and accept the dispatch and proceed to the source to pick up materials to be transported.

The navigation system 40, or server 24, may also provide routing information from the current vehicle 36 location to the source location in the event that the vehicle is not located at the source location. In this manner, the vehicle 36 may arrive at the source location in an efficient manner. When the driver arrives at the source, the materials are loaded on the vehicle 36 and the driver proceeds to the destination. The location of the vehicle 36 may be tracked at periodic intervals in order to monitor the progress of the delivery. For example, a dispatcher may determine that a particular customer or site has materials to are to be transported. The dispatcher may make a determination, or a software application associated with the server 24 makes a determination, of a particular vehicle 36 that should transport the materials. For example, a determination may be made that a particular vehicle 36 will be available to transport the materials and that the vehicle 36 is in closer proximity to the source than other vehicles that may be available to transport the materials. This dispatch is sent to the navigation system 40 as a data message, and an application that operates on the navigation system 40 receives such communications. The driver may receive the communication and perform any required actions to acknowledge the dispatch.

With continuing reference to FIG. 1, the server 24 may be connected by any appropriate connection to the network 28. The network 28, as mentioned above, may include a public switched telephone network (PSTN) that is in turn connected to the wireless base station 32. The server 24 may have a modem which connects to the network 28 to establish a connection to a particular navigation system 40 through the wireless base station 32. Each of the navigation systems 40 has a unique identification such as a unique phone number or other identification. The server 24 may establish any type of communication with the navigation system 40 to indicate that the job is waiting and provide navigation information. In one embodiment, the server 24 pushes the job and relevant information to a desired navigation system 40 using a control channel associated with the wireless communication network. The driver accesses the dispatch through a user interface on the navigation system 40. The driver, in some embodiments, may and either accept the job or reject the job, with an acknowledgment sent back to the server through the wireless base station 32 and network 28.

Figure 2:
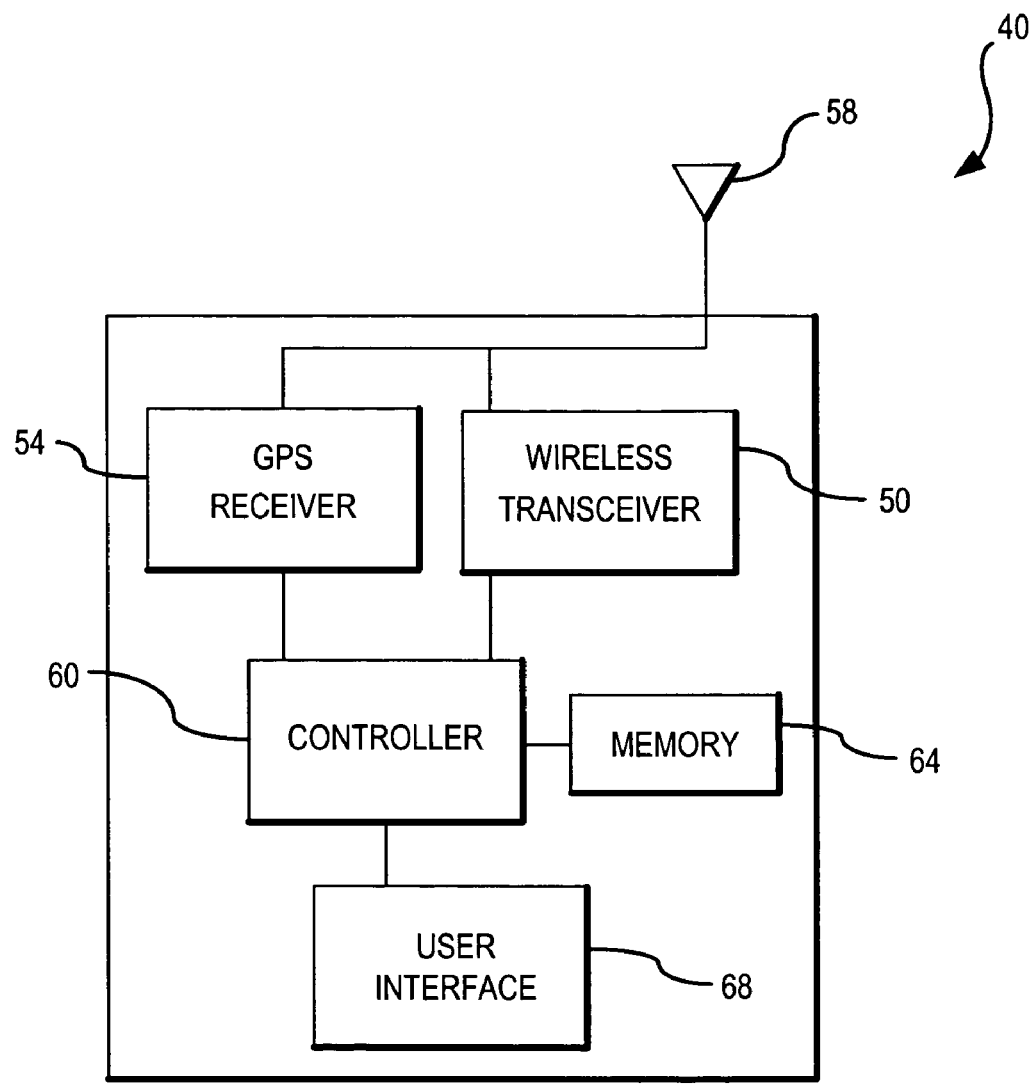
FIG. 2 is a block diagram illustration of an embodiment of an asset tracking unit.

Referring now to FIG. 2, a navigation system embodiment 40 is described. In this embodiment, the navigation system 40 includes circuitry and components that are typical of many such devices. The device includes a wireless transceiver 50, a GPS receiver 54 and an antenna 58. The wireless transceiver 50 is operable to receive wireless signals that are received at antenna 58 and demodulate the signals and provide them to a controller 60. The wireless transceiver 50 may also receive signals from the controller, modulate the signals onto an RF signal and transmit the modulated signal over the antenna 58. The GPS receiver 54 is operable to receive a GPS signal from an appropriate number of GPS satellites to determine location information. The GPS receiver 54 is also connected to antenna 58. Antenna 58, while illustrated as a single antenna, may include one or more separate antennas, such as a separate antenna for the GPS receiver, a send antenna, and/or a receive antenna. The controller 60 is coupled to a memory 64 and a user interface 68. The controller 60 controls operations of the navigation system 40 including operating any applications that are running on the navigation system 40. The memory 64 may include any type of memory suitable for such a navigation system 40 including volatile and/or non-volatile memory. The memory 64 includes code to run the different applications for the navigation system 40. The user interface 68 may be any appropriate user interface including an audio interface, a visual and/or graphical user interface that is capable of providing a graphical display of a relevant area map, and an associated keypad and/or any other physical input device.

Figure 3:
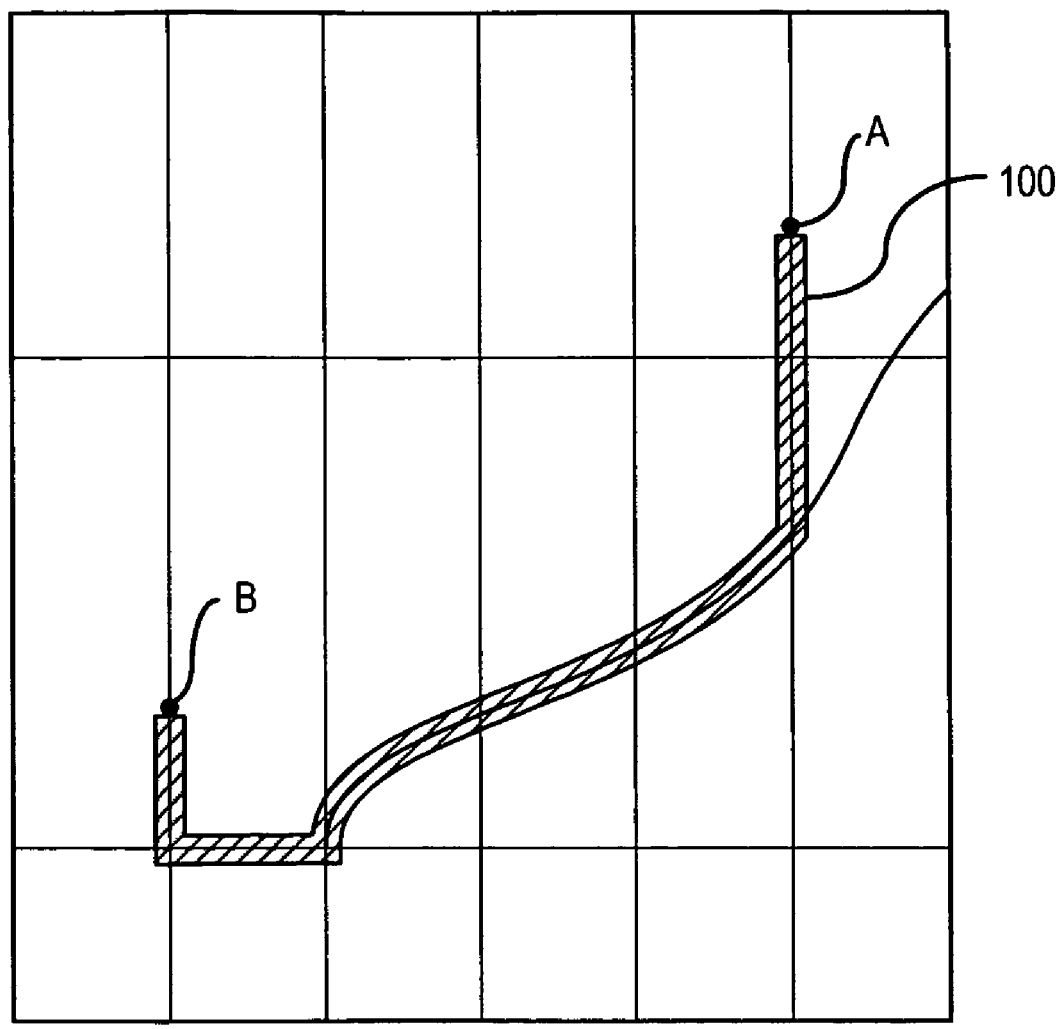
FIG. 3 is an illustration of a map of an area with a recommended route from a source location to a destination location.

Referring now to FIG. 3, a portion of a map is illustrated. In this embodiment, a vehicle is starting at point A and traveling to point B. A navigation system provides a recommended route 100, illustrated in FIG. 3 in cross-hatching. The recommended route 100 may be based on any of a number of factors, and is selected from one of a number of different alternatives. Each of the alternatives is evaluated based on the factors and the recommended route 100 selected based on the route that is the optimal route based on these factors. In one embodiment, such factors include distance of each of the alternative routes, an expected speed that the vehicle may travel at while traveling the route, weather conditions, traffic conditions, construction, among others. Distance of each of the alternative routes may be evaluated to determine the distance the vehicle must travel if that route is taken from point A to point B. Once the distance for each of the alternative routes is determined, other factors may be evaluated. For example, the expected speed that the vehicle will travel while on each of the alternative routes may be considered as such a factor. The expected speed may include maximum posted speed limits for various portions of the route, along with the number of stop signs or traffic signals. The expected speed may be analyzed with respect to the distance for each of the alternative routes to determine route with the shortest expected travel time. Such a route may be selected as the recommended route 100. The factors in selecting a recommended route 100 may also include weather conditions, with travel times over different portions of the alternative routes adjusted based on such conditions, such as rain or snow. Traffic conditions may also be considered, such as expected traffic delays resulting from rush hour traffic. Similarly, construction along one or more of the different alternative routes may be considered. Taking these, along with other potential factors, the navigation system selects a recommended route 100 from point A to point B. Importantly, in order for the navigation system to provide an appropriate recommended route based on routing algorithms therein, the data related to each of the potential routes needs to be accurate. Once the recommended route 100 is selected, the navigation system displays the recommended route 100, or a portion thereof, on a user interface of the system. In some embodiments, the system also provides audio indications of the recommended route 100. The navigation system monitors the location of the vehicle and generates an exception report in the event that the vehicle deviates significantly from the recommended route 100. The generation of such an exception report is described in more detail below.

Figure 4:
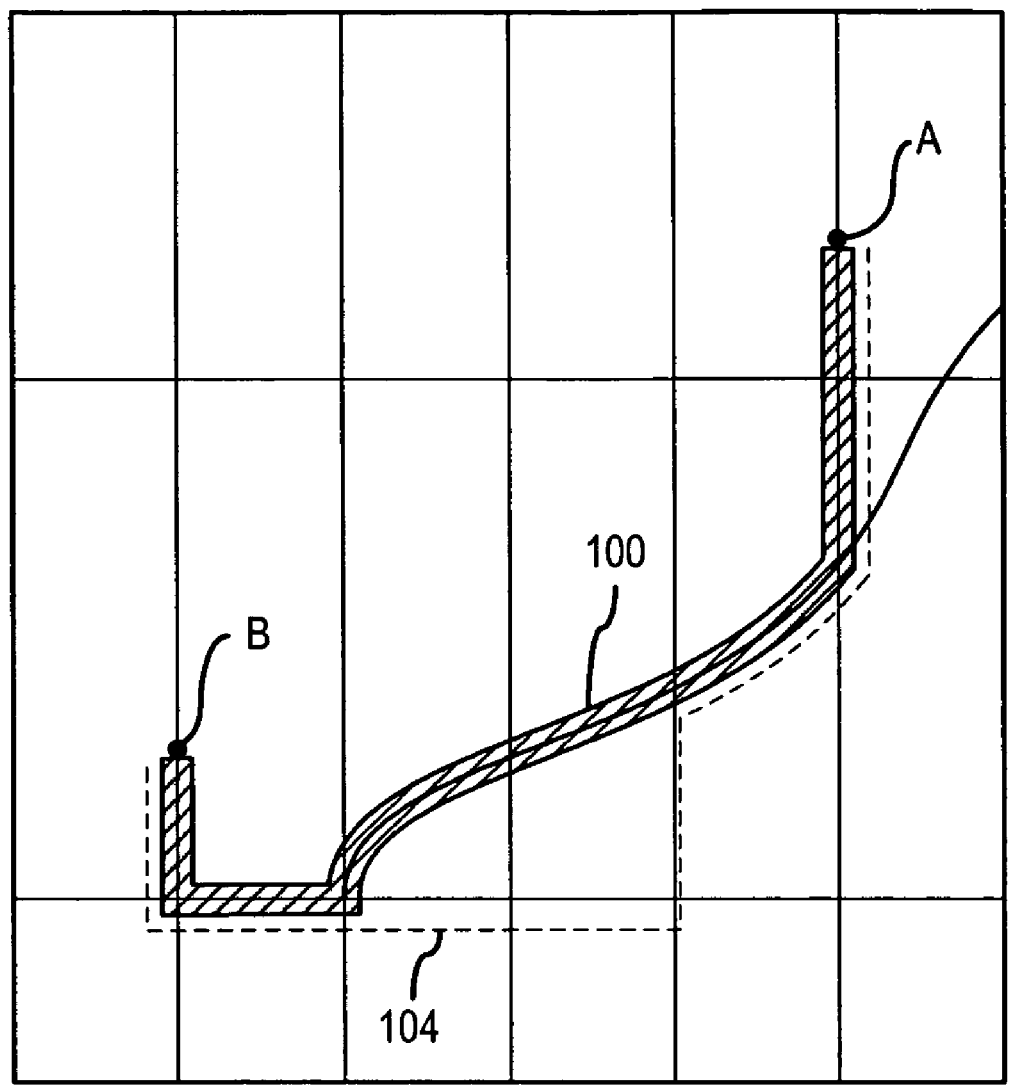
FIG. 4 is an illustration of a the map of FIG. 3 with an actual route of a vehicle between the source location and destination location.

An example of an actual route 104 traveled by a vehicle from point A to point B is illustrated as a dashed line in FIG. 4. In this embodiment, the actual route 104 is different than the recommended route 100. In one embodiment, the navigation system analyzes the location information provided from the GPS system and determines if it is likely that the recommended route 100 was not followed for a typical reason. As will be understood, if every deviation from a recommended route were analyzed, a significant amount of resources would be required to perform such analysis, and thus it is determined if such a deviation is a typical deviation and should not be reported. Thus, any deviations that are reported are more likely to be related to the recommended route and data used in making the determination of the recommended route. Such a typical reason may include deviating from the recommended route 100 to stop for a meal or other service. When analyzing the location information, the navigation system may determine that the vehicle was stopped for a significant amount of time, indicating that the driver stopped for some reason. In one embodiment, is it assumed that a stop for a significant amount of time, such as greater than 30 minutes, indicates that the driver intentionally deviated from the recommended route 100 for the purpose of making such a stop. As will be understood, the length of time after which it is assumed that a driver intentionally deviated from the recommended route 100 for purposes of the stop may be selected based on the particular application and typical driving habits of drivers for a particular application. In such a situation, the deviation from the recommended route 100 is not noted as an exception. In cases where the vehicle is not stopped for any significant amount of time, it is assumed that the driver of the vehicle deviated from the recommended route because the driver made a determination that the actual route 104 was an optimal route for some reason not contemplated when selecting the recommended route 100. In such a case, the navigation system generates an exception report and transmits such a report to the server. The server may push a message to the navigation system querying the driver for the reason for the deviation. If the driver responds to the query that the route traveled was different than the recommended route 100 because the different route 104 was the optimal route, the server may accept this data and use it in the future when making determinations for recommended routes in that particular area. In other embodiments, the server provides routing information to the navigation system, monitors the location of the vehicle, notes any deviations from the recommended route, and makes the determination if the deviation was likely the result of the recommended route not being the optimal route. The server may then query the driver. In still further embodiments, the server may query the driver as to any deviations immediately upon determining the vehicle has deviated from the recommended route.

Figure 5:
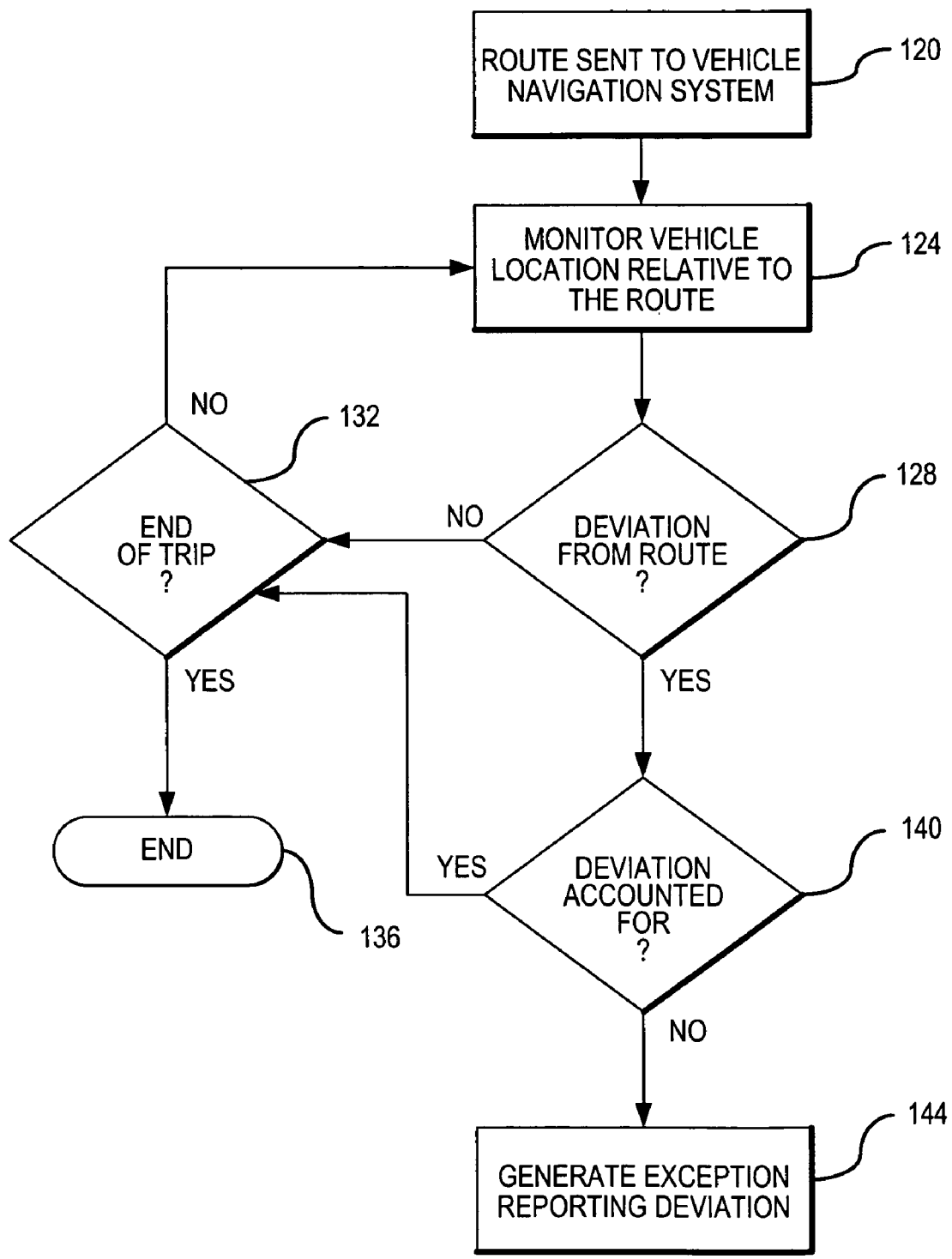
FIG. 5 is a flow chart illustration of the operations for determining a deviation from a recommended route.

Referring now to FIG. 5, the operations performed to generate routing exception notifications are described. In this embodiment, the route is sent to the vehicle navigation system, as noted at block 120. The route may be sent to the navigation system as part of a dispatch message including other information, such as the types of materials to be transferred, a target pick-up and/or delivery time, and delivery priority, to name but a few. Alternatively, in an embodiment, the server provides source and destination locations to the vehicle navigation system, and the recommended route is determined at the vehicle. At block 124, the location of the vehicle is monitored in relation to the recommended route for the vehicle to travel between the source and destination. Such monitoring, in an embodiment, is performed by the server that receives periodic communications from the vehicle navigation system that report the location of the vehicle. In other embodiments, the vehicle navigation system monitors the location of the vehicle in relation to the recommended route. In such embodiments, the vehicle navigation system may also communicate location information to the server periodically, although such communications may occur less frequently then embodiments where the server monitors the location of the vehicle. At block 128, it is determined if the vehicle has deviated from the recommended route. As mentioned above, such a determination may occur, for example, when the vehicle deviates from the recommended route and the vehicle does not make any stops before rejoining the recommended route or arrives at the destination. If it is determined that the vehicle has not deviated from the recommended route, it is determined if the vehicle has reached the end of trip, as noted at block 132. It is determined, in an embodiment, that the vehicle has reached the end of trip when the vehicle is at the destination location. In other embodiments, the driver makes an acknowledgment using the vehicle navigation system that the vehicle has arrived at the destination. If it is determined that the vehicle is not at the end of trip, the operations of blocks 124 through 132 are continued. If it is determined at block 132 that the vehicle is at the end of trip, the operations end, and no exceptions are noted, as indicated at block 136. If it is determined at block 128 that the vehicle has deviated from the recommended route, it is then determined if the deviation is accounted for by a set of rules associated with deviations, as noted at block 140. The set of rules related to route deviations may include rules related to stops for significant periods of time that are assumed to be intentional stops by the driver and thus do not indicate that the recommended route was not the optimal route. Such rules may also compare such stops with known frequent stops by vehicle drivers, such as commonly used service stations. In the event that the vehicle is stopped at the location of such a service station, it is assumed that the driver not deviate from the recommended route because of a problem with the recommended route. If it is determined that any such deviations are accounted for by the rules, the operations as described at block 132 are repeated. If the deviation from the recommended route is not accounted for by any of the rules, then an exception is generated to report the deviation in the route traveled by the vehicle, as indicated at block 144.

In one embodiment, a dispatcher receives the exception report and queries the driver to determine the reason for the deviation. In the event that the deviation was because the recommended route was not the optimal route, the dispatcher can note this information in the application that determines the recommended routes, and this information may be used in the future as a factor when determining a recommended route in the particular area of the deviation. In another embodiment, the vehicle navigation system includes a rule set that contains rules that determine whether the navigation system should generate an exception report. In such an embodiment, the vehicle navigation system monitors the vehicle location with respect to the recommended route. In the event that the vehicle deviates from the expected route, a query is generated and displayed on the user interface. Such a query may include an alert that the vehicle is no longer on the recommended route, and provide the vehicle operator with two or more options for response. Such options for response may indicate that the driver has deviated from the recommended route because there is a problem with the recommended route, or that the driver has deviated from the recommended route not because of a problem with the route, but rather for some other reason. In the event that the driver indicates there is a problem with the recommended route, an exception is generated that may be used to modify routes in the future. Alternatively, in some embodiments, the server monitors vehicle location and transmits a query to the driver in the event that the vehicle deviates from the recommended route. Similarly, the server may provide a notification to a dispatcher, who may then contact the driver to determine the reason for the deviation from the recommended route.

As will be readily apparent to one of skill in the art, the reasons for a deviation from a recommended route may be numerous, and many of which will not directly relate to the recommended route not being an optimal route. Thus, a dispatcher or other individual can determine from the driver query whether the deviation actually relates to the recommended route. For example, the deviation may occur because of a traffic accident or other brief problem related to the recommended route. In such a case, the recommended route may not necessarily require any changes in the future. However, such information may be collected and if a pattern of such problems are observed at a particular portion of a recommended route, this may be included as a factor in route determination. For example, if a similar deviation is made on two or more trips when traveling on a particular route, such a pattern may be recognized and reported as an exception with a higher confidence that such a deviation is the result of a non-optimal recommended route. In one embodiment, an exception is noted when two or more similar deviations are made on a route within a certain time period, such as within a few days of each other. In still further embodiments, an exception is noted when a similar deviation occurs over a relatively long period of time, indicating that one or more deviations within a short time period may have been transient problems, such as temporary construction along a portion of a route.

What is claimed is:

1. A method for determining exceptions from a recommended route in a navigation application, comprising:
   providing to a computer assisted navigation system a recommended route for a vehicle to travel from a first location to a second location;
   monitoring a location of the vehicle when the vehicle is traveling from the first location to the second location;
   determining that the vehicle has deviated from the recommended route;
   determining if the deviation from the recommended route is one of a set of expected deviations by examining a set of rules associated with the monitored location of the vehicle;
   querying, by a dispatcher located remote from the vehicle, a driver of the vehicle when the deviation from the recommended route is different than the one of the set of expected deviations;
   receiving a response from the driver of the vehicle indicating that the recommended route is not an optimal route; and
   generating an exception notification based on the response from the driver of the vehicle.

2. The method, as claimed in claim 1, wherein said determining that the vehicle has deviated from the recommended route comprises:
   firstly determining that the monitored location of the vehicle is different than an expected location provided in the recommended route; and
   secondly determining that a subsequent monitored location of the vehicle is within another expected location provided in the recommended route.

3. The method, as claimed in claim 2, wherein said determining if the deviation from the recommended route is one of the set of expected deviations comprises:
   determining that the vehicle did not stop for longer than a predetermined time between said firstly and secondly determining steps.

4. The method, as claimed in claim 1, wherein said determining if the deviation from the recommended route is one of the set of expected deviations comprises:
   firstly determining that the monitored location of the vehicle is greater than a predetermined distance from an expected location provided in the recommended route.

5. The method, as claimed in claim 4, further comprising, after said firstly determining:
   secondly determining that a predetermined length of time has elapsed since the monitored vehicle location has been different than the expected location provided in the recommended route.

6. The method, as claimed in claim 1, wherein said determining that the vehicle has deviated from the recommended route comprises:
   firstly determining that the monitored location of the vehicle is different than an expected location provided in the recommended route; and
   secondly determining that a subsequent monitored location of the vehicle is the same as the monitored location of the vehicle.

7. The method, as claimed in claim 6, wherein said determining if the deviation from the recommended route is one of the set of expected deviations comprises:
   thirdly determining that an elapsed time between said firstly determining step and said secondly determining step was not longer than a predetermined time period.

8. The method, as claimed in claim 1, further comprising:
   modifying the recommended route in response to generating the exception notification.

9. A computer assisted navigation system that is operably interconnected with a vehicle and operable to assist a driver of the vehicle with navigation, comprising:
   a location sensor operable to output a current location of the vehicle;
   a wireless communication portion operable to send/receive wireless communication;
   a controller operably coupled to said location sensor and wireless communication portion; and
   a user interface operable to provide the driver with navigation information, wherein said controller is operable to receive current location information from said location sensor, use said location information to determine that the vehicle has deviated from a recommended route, determine if the deviation from the recommended route is one of a set of expected deviations by examining a set of predefined rules associated with the current location of the vehicle, query, by a dispatcher located remote from the vehicle, a driver of the vehicle when the deviation from the recommended route is not the one of the set of expected deviations, receive a response from the driver of the vehicle indicating that the recommended route is not an optimal route, and generate an exception notification based on the response from the driver of the vehicle.

10. The computer assisted navigation system, as claimed in claim 9, wherein said controller is operable to receive current location information from said location sensor and transmit, using said wireless communication portion, said current location information to a remote server.

11. The computer assisted navigation system, as claimed in claim 9, wherein said controller generates a further exception notification when the vehicle is not stopped for longer than a predetermined time period when the current location of the vehicle is different than a predetermined location within the recommended route.

12. The computer assisted navigation system, as claimed in claim 9, wherein said controller is further operable to modify the recommended route in response to generating the exception notification.

13. A tangible data storage medium comprising executable data capable of causing a programmable device to perform the steps of:
providing a recommended route for a vehicle to travel from a first location to a second location;
monitoring a location of the vehicle when the vehicle is traveling from the first location to the second location;
determining that the vehicle has deviated from the recommended route;
determining if the deviation from the recommended route is one of a set of expected deviations by examining a set of rules associated with the monitored location of the vehicle;
querying, by a dispatcher located remote from the vehicle, a driver of the vehicle when the deviation from the recommended route is different than the one of the set of expected deviations;
receiving a response from the driver of the vehicle indicating that the recommended route is not an optimal route; and
generating an exception notification based on the response from the driver of the vehicle.

14. The tangible data storage medium of claim 13 wherein said determining that the vehicle has deviated from the recommended route comprises:
firstly determining that the monitored location of the vehicle is different than an expected location provided in the recommended route; and
secondly determining that a subsequent monitored location of the vehicle is within another expected location provided in the recommended route.

15. The tangible data storage medium of claim 14 wherein said determining if the deviation from the recommended route is one of the set of expected deviations comprises:
determining that the vehicle did not stop for longer than a predetermined time between said firstly and secondly determining steps.

16. The tangible data storage medium of claim 13 wherein said determining if the deviation from the recommended route is one of the set of expected deviations comprises:
firstly determining that the monitored location of the vehicle is greater than a predetermined distance from an expected location provided in the recommended route.

17. The tangible data storage medium of claim 16 further comprising, after said firstly determining:
secondly determining that a predetermined length of time has elapsed since the monitored vehicle location has been different than the expected location provided in the recommended route.

18. The tangible data storage medium of claim 13 wherein said determining that the vehicle has deviated from the recommended route comprises:
firstly determining that the monitored location of the vehicle is different than an expected location provided in the recommended route; and
secondly determining that a subsequent monitored location of the vehicle is the same as the monitored location of the vehicle.

19. The tangible data storage medium of claim 18 wherein said determining if the deviation from the recommended route is one of the set of expected deviations comprises:
thirdly determining that an elapsed time between said firstly determining step and said secondly determining step was not longer than a predetermined time period.

20. The tangible data storage medium of claim 13, wherein said programmable device further performs:
modifying the recommended route in response to generating the exception notification.

21. A method for determining exceptions from a recommended route in a computer assisted navigation application, comprising:
providing a computer assisted navigation system that is capable of noting deviations between a location of the vehicle and a recommended route for the vehicle;
determining that the vehicle has deviated from the recommended route;
determining that another vehicle made a similar deviation from the recommended route;
querying, by a dispatcher located remote from the vehicle, a driver of the vehicle when it is determined that at least two vehicles made the similar deviation from the recommended route;
receiving a response from the driver of the vehicle indicating that the recommended route is not an optimal route; and
generating an exception notification based on the response from the driver of the vehicle.

22. The method, as claimed in claim 21, wherein said determining that the another vehicle made a similar deviation comprises:
determining if the another vehicle has been provided with the recommended route;
determining that the another vehicle has deviated from the recommended route; and
determining if the deviations from the recommended route of the vehicle and the another vehicle are substantially similar.

23. The method, as claimed in claim 22, further comprising:
determining that the deviations from the recommended route of the vehicle and the another vehicle occurred within a predetermined time period.

24. The method, as claimed in claim 21, wherein said determining that a vehicle has deviated from the recommended route comprises:
collecting the location of the vehicle;
comparing the location of the vehicle with the recommended route;
determining that the location of the vehicle is different than the recommended route for at least a portion of the recommended route; and
determining that the vehicle deviated from the recommended route when the difference in location of the vehicle is not within a set of predefined rules.

25. The method, as claimed in claim 21, further comprising:
modifying the recommended route in response to generating the exception notification.

* * * * *